US010584499B2

(12) United States Patent
Del Real et al.

(10) Patent No.: US 10,584,499 B2
(45) Date of Patent: Mar. 10, 2020

(54) HYBRID DRIVE TRAIN FOR SELF PROPELLED POWER TROWEL

(71) Applicant: Multiquip, Inc., Carson, CA (US)

(72) Inventors: Erick M. Del Real, Meridian, ID (US); Larry Jake Chapple, Boise, ID (US); Nathaniel Cody Bateman, Boise, ID (US); Jeffrey Kevin Davis, Boise, ID (US)

(73) Assignee: Multiquip Inc., Cypress, CA (US)

( * ) Notice: Subject to any disclaimer, the term of this patent is extended or adjusted under 35 U.S.C. 154(b) by 0 days.

(21) Appl. No.: 16/006,787

(22) Filed: Jun. 12, 2018

(65) Prior Publication Data

US 2018/0355624 A1 Dec. 13, 2018

Related U.S. Application Data

(60) Provisional application No. 62/518,559, filed on Jun. 12, 2017, provisional application No. 62/621,029, filed on Jan. 23, 2018.

(51) Int. Cl.

| | | |
|---|---|---|
| *E04F 21/24* | (2006.01) | |
| *E01C 19/42* | (2006.01) | |
| *E01C 19/40* | (2006.01) | |
| *E04F 21/16* | (2006.01) | |
| *B60L 9/26* | (2006.01) | |
| *B60L 50/61* | (2019.01) | |

(Continued)

(52) U.S. Cl.
CPC ............. *E04F 21/247* (2013.01); *B60L 9/26* (2013.01); *B60L 50/13* (2019.02); *B60L 50/61* (2019.02); *E01C 19/40* (2013.01); *E01C 19/42* (2013.01); *E04F 21/161* (2013.01); *B60L 3/003* (2013.01); *B60L 2200/40* (2013.01); *B60L 2210/42* (2013.01); *B60L 2220/16* (2013.01); *B60L 2220/42* (2013.01); *B60W 10/08* (2013.01); *B60W 20/13* (2016.01); *B60W 2050/0008* (2013.01)

(58) Field of Classification Search
CPC ...... E04F 21/247; E04F 21/161; E01C 19/40; E01C 19/42; B60L 3/003; B60L 9/26; B60L 50/13; B60L 2210/42; B60W 2050/0008; B60W 10/08; B60W 20/13
USPC .............................................. 404/72–75, 112
See application file for complete search history.

(56) References Cited

U.S. PATENT DOCUMENTS 5,375,452 A * 12/1994 Helldorfer ............... B60T 8/172
 73/129
5,584,598 A * 12/1996 Watanabe ............. E04F 21/245
 404/112

(Continued)

*Primary Examiner* — Raymond W Addie
(74) *Attorney, Agent, or Firm* — Sean D. Burdick (57) ABSTRACT

A hybrid drive train for a self propelled power trowel includes a frame having a centerline from front to rear, an engine-generator set, a pair of rotors with trowel blades tiltably connected to the frame and positioned to support the frame above a concrete surface being finished, electric motors for driving the rotors, means for tilting each rotor toward and away from the centerline, and means for tilting a rotor fore and aft, parallel to the centerline. A rectifier and inverter in series at the engine-generator output allows engine speed to be regulated by a capacitor bank, and usage of highly efficient brushless AC synchronous motors to drive the rotors. A rechargeable battery may be connected in parallel with the capacitor bank.

20 Claims, 7 Drawing Sheets

(51) Int. Cl.
  *B60L 50/13* (2019.01)
  *B60W 50/00* (2006.01)
  *B60L 3/00* (2019.01)
  *B60W 10/08* (2006.01)
  *B60W 20/13* (2016.01)

(56) References Cited

U.S. PATENT DOCUMENTS

| | | | | |
|---|---|---|---|---|
| 5,675,226 | A | * 10/1997 | Riola' | H02K 29/03 |
| | | | | 318/400.26 |
| 2005/0220541 | A1 | * 10/2005 | Corbitt | E04F 21/245 |
| | | | | 404/112 |
| 2012/0027514 | A1 | * 2/2012 | Hall | E01C 23/065 |
| | | | | 404/91 |
| 2013/0129419 | A1 | * 5/2013 | Hanson | E04F 21/247 |
| | | | | 404/112 |
| 2013/0302089 | A1 | * 11/2013 | Sina | E02D 3/032 |
| | | | | 404/84.1 |

\* cited by examiner

HYBRID DRIVE TRAIN FOR SELF PROPELLED POWER TROWEL

RELATED APPLICATIONS

This application claims priority to U.S. Provisional Application 62/518,559 filed on Jun. 12, 2017, and to U.S. Provisional Application 62/621,029 filed on Jan. 23, 2018, both of which are fully incorporated herein by reference.

BACKGROUND OF THE INVENTION

Field of the Invention

The present invention relates generally to power trowels for finishing concrete surfaces such as floors, more specifically to self-propelled ride-on trowels, and most specifically to a hybrid drive train for a self-propelled ride-on trowel having dual counter-rotating rotors.

Description of Related Art

Self-propelled riding trowels, in general, are well known in the art. Primarily these trowels are used in concrete finishing operations typically on large-scale pours for floors and foundations to allow an operator to finish vast areas of concrete quickly and efficiently. An on-board engine typically serves as the prime mover for the riding trowel. Other components of the drive train, typically a combination of hydraulic and mechanical linkage, couple the mechanical energy of the engine to two counter-rotating rotor assemblies at the base of the trowel. The rotor assemblies drive metal trowel blades that provide both the motive force for moving the trowel and also the means for finishing the concrete surface beneath the trowel.

The larger class of self-propelled riding trowels use 70 hp or larger size engines, weigh in excess of 2300 lbs, and typically have output torque ratings in the 1000 ft-lb to 1500 ft-lb range. While high torque ratings are desirable when driving the rotor blades under the weight of the trowel against a concrete pour, higher-powered engines generally increase fuel consumption and lower overall efficiency. What is needed to advance the design of riding trowels is a drive train that can deliver greater torque while maintaining or improving overall efficiency.

SUMMARY OF THE INVENTION

The present invention improves the efficiency of self-propelled ride-on trowels that have dual counter-rotating rotors used for finishing concrete floors. Better efficiency is achieved by replacing the conventional hydraulic drive with brushless AC synchronous motors as a means for driving the dual rotors. This design reduces the amount of energy lost to waste heat that is discharged from a conventional hydraulic drive system. The reduction in energy loss allows for selection of a prime mover (e.g. gas or diesel engine) that optimizes the power density of the trowel.

In one embodiment of the invention, a self propelled power trowel according to the invention includes a rigid frame adapted to be disposed over a concrete surface. The rigid frame has a front and a rear and defines a centerline from front to rear. The power trowel further includes a means attached to the rigid frame for providing electrical power to said power trowel, a pair of rotatable rotor assemblies that are tiltably connected to the rigid frame and that frictionally contact the concrete surface to support the rigid frame thereabove. The power trowel further includes electrical motor means operatively connected to the electrical power providing means, and operatively connected to the rotatable rotor assemblies for rotating the rotor assemblies. The power trowel further includes at least three means for tilting the rotor assemblies, two of which are operably interconnected between the rigid frame and each rotor assembly for selectively and independently tilting each rotor assembly toward and away from the centerline of the rigid frame, and the third of which is operatively interconnected between the rigid frame and one of the rotor assemblies for tilting that rotor assembly fore and aft, parallel to the centerline of the rigid frame.

The electrical power source attached to the frame of the power trowel may be an engine-generator set, a battery, or a combination of the two. The engine-generator set may be an internal combustion engine mechanically coupled to an electrical generator and configured to recharge the battery. The engine may run on diesel fuel, gasoline, or propane. A capacitor bank may be connected in parallel with the battery to smooth voltage transients and help the engine maintain a more constant speed. In one embodiment, the generator is configured to produce three phase alternating current. The power trowel may be further configured with means such as rectifiers for receiving the three phase alternating current and rectifying said current to a selectable voltage direct current output, and with means for receiving the selectable voltage direct current output from the rectifiers and inverting the voltage into a three phase alternating current output of preselectable frequency, duty cycle, and voltage.

Another embodiment of the invention for hybrid drive train for a self propelled power trowel includes a rigid frame having a front and a rear and defining a centerline from front to rear, a means attached to the rigid frame for providing electrical power to the power trowel, a pair of rotatable rotor assemblies tiltably connected to the rigid frame and configured to contact a concrete surface below the rigid frame and to support the rigid frame thereabove, one or more electrical motors electrically connected to the electrical power providing means and operatively connected to the rotatable rotor assemblies to cause rotation of said rotor assemblies, a means for tilting each rotor assembly toward and away from the centerline of the frame, and a means for tilting at least one of the rotor assemblies fore and aft, parallel to the centerline of the frame. The means for providing electrical power may preferably comprise an engine and generator. In one embodiment, the hybrid drive train may include a means for regulating the speed of the engine, such as a DC rectifier and capacitor bank coupled to the output of the generator. In another embodiment, the electrical motors that rotate the rotor assemblies may be brushless AC synchronous motors. A rechargeable battery may be connected in parallel with the capacitor bank.

Another embodiment of the invention for a hybrid drive train for a self propelled power trowel includes a frame having a front and a rear and defining a centerline from front to rear, an engine-generator set attached to the frame and configured to provide electrical power to the power trowel, a pair of rotatable rotor assemblies tiltably connected to the frame and configured to contact a concrete surface below the frame and to support the frame thereabove, one or more rectifiers attached to the frame and configured to convert electrical power from the engine-generator set to DC power, and one or more brushless AC synchronous motors electrically connected to the one or more rectifiers and operatively connected to the rotatable rotor assemblies to cause rotation of said rotor assemblies. The hybrid drive train may further include capacitance for regulating speed of the engine-generator set.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions shown are exemplary only. In the drawings, like reference numerals may designate like parts throughout the different views, wherein:

DETAILED DESCRIPTION OF THE INVENTION

An object of the present invention is to improve the efficiency of a self-propelled ride-on trowel having dual counter-rotating rotors such as those used for finishing concrete flooring. The objective is achieved, generally, by reducing the energy loss to waste heat discharged from a traditional hydraulic drive system through the use of brushless AC synchronous motors as a means for driving the dual rotors. The reduction in energy loss allows for selection of a prime mover (e.g. gas or diesel engine) that optimizes the power density of the trowel.

Figure 1:
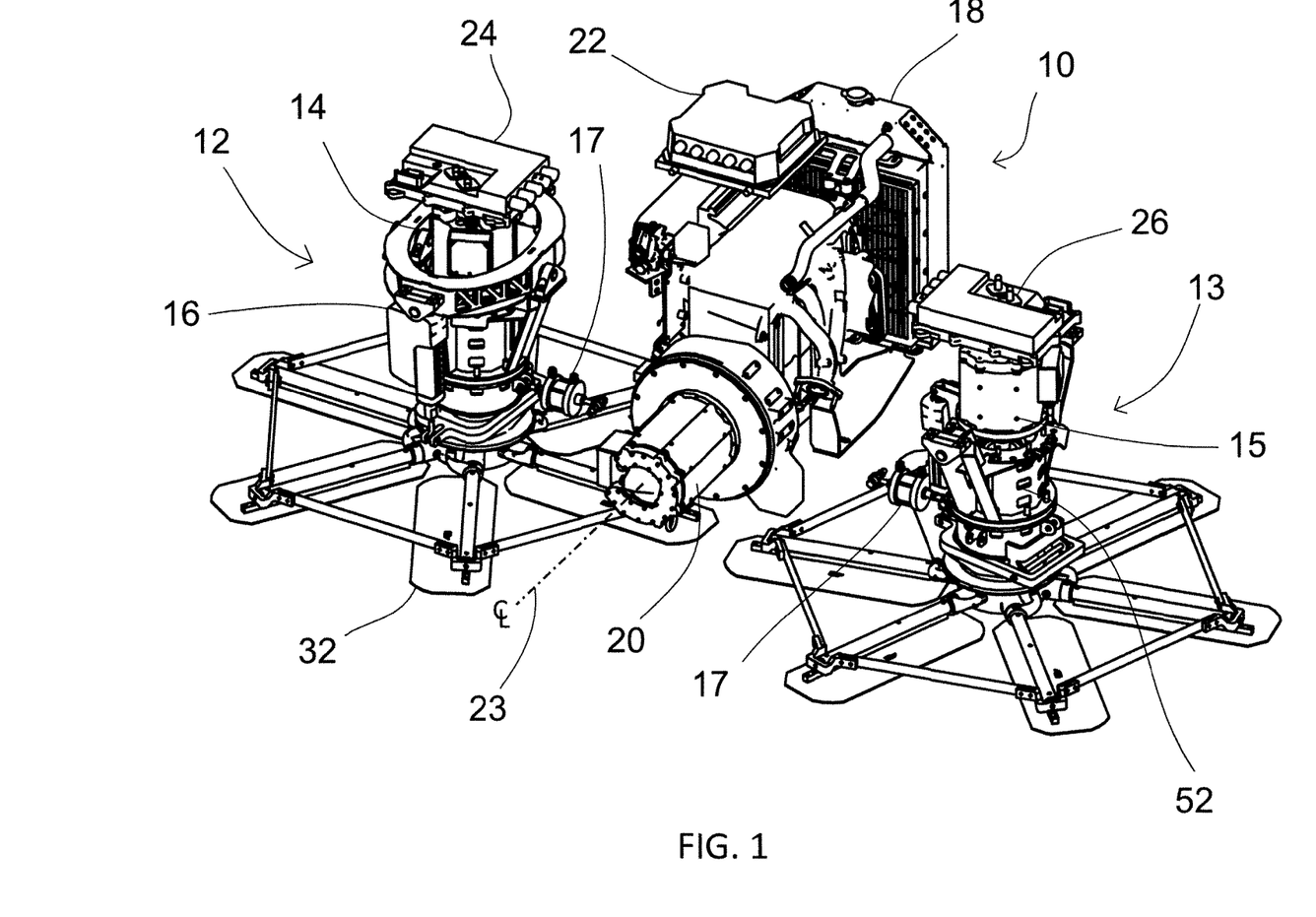
FIG. 1 is a perspective view of one embodiment of a hybrid drive train for a self propelled power trowel according to the invention.

FIG. 1 shows a perspective view of one embodiment of a self propelled power trowel according to the invention. The drive train is mounted to a rigid frame 60 in a manner known in the art and depicted, for example, in U.S. Pat. No 8,998,531, which is fully incorporated herein by reference. For simplicity and ease of illustration, the rigid frame is omitted from the figures herein. The main components of the hybrid drive train 100 include an electrical power source 10, a pair of rotatable rotor assemblies 12, 13, electric motors 14, 15 operatively connected between the electrical power source 10 and the rotatable rotor assemblies 12, 13, respectively, a set of steering actuators 17 configured for tilting the rotor assemblies 12, 13, and a set of pitch actuators 16.

The electrical power source 10 is attached to the rigid frame and provides electric power to the power trowel. Power source 10 is preferably configured to output DC power for input to 3-phase inverters 24, 26 that drive AC motors 14, 15 of the rotor assemblies 12, 13. In one embodiment, the DC power is obtained by mechanically coupling a 3-phase AC electrical generator 20 to an internal combustion engine 18 to form an engine-generator set. The output of the AC generator 20 is then coupled to a DC rectifier 22. In another embodiment, the DC power may be obtained solely from a battery, or from the combination of a battery 28 and battery charger 30.

The rotor assemblies 12, 13 each comprise a set of rotatable trowel blades 32, that are tiltably connected to the rigid frame of the power trowel. The rotatable trowel blades 32 are disposed at the bottom of the power trowel and are configured for making frictional contact with a concrete surface. Pitch actuators 16, one per rotor assembly, are configured to rotate the trowel blades 32 about a center axis of the trowel arms to adjust the pitch angle of each blade 32. The rotor assemblies 12, 13 are thus configured to support the rigid frame above the concrete surface. The rotor assemblies 12, 13 are each coupled, respectively, through a gearbox 52 to the shaft of the corresponding AC motor 14 or 15. These motors are each operatively connected to the electrical power source 10, so that energization thereby of the motors 14 and 15 causes rotation of the trowel blades 32 across the concrete surface. In other embodiments of riding trowels, hydraulic actuators, rather than electric motors, can be used to set the direction of rotation of each rotor.

Figure 2:
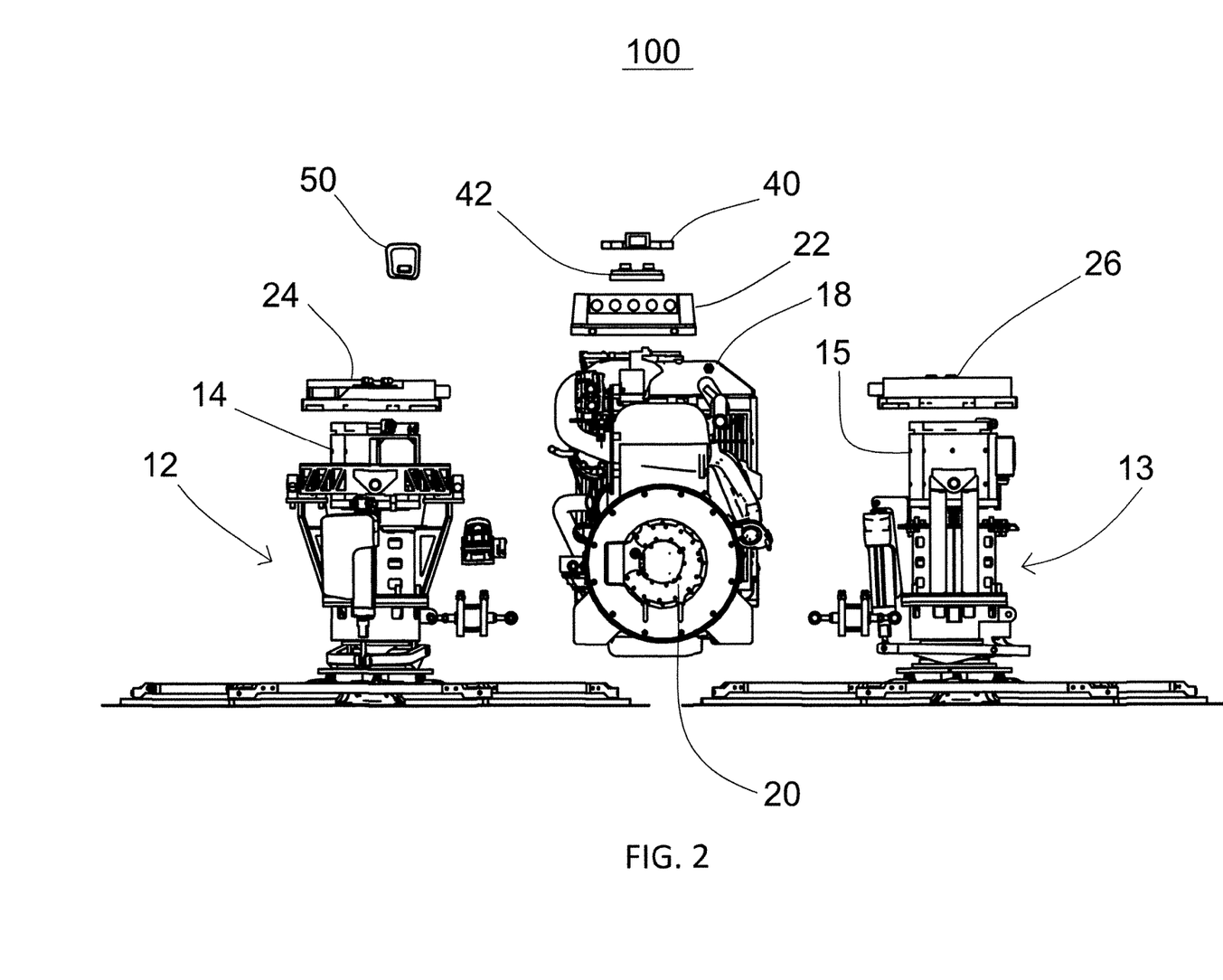
FIG. 2 is an exploded frontal view of various components in one embodiment of a hybrid drive train for a self propelled power trowel according to the invention.

The hybrid drive train 100 includes at least three means for tilting the rotor assemblies 12, 13 with respect to the rigid frame, to cause movement of the power trowel across the surface of the concrete floor. The tilting action of each of the tilting means is best described relative to the front and rear ends of the power trowel and to a centerline 23 running centrally through the power trowel from the front end to the rear end. For purposes of illustration, the front and rear ends and the centerline 23 can be defined by the location of the electrical generator 20. FIGS. 1 and 2 show the electrical generator 20 mounted at the front end of the power trowel. The end opposite the mounting location of the electrical generator 20 is the rear end of the power trowel, and the centerline 23 is an imaginary line that runs from the rear end to the front end along the central axis of the electrical generator 20.

In one embodiment, one of the means for tilting a rotor assembly 12 or 13 may be a steering actuator 17 that is operably interconnected between the rigid frame and a rotor assembly 12 or 13. This configuration allows each rotor assembly 12 or 13 to be tilted fore and aft, about an axis that is substantially perpendicular to the centerline of the rigid frame. This action, combined with frictional rotation of the trowel blades 32, causes the power trowel to move from side to side along the concrete surface. The second and third means for tilting a rotor assembly 12 or 13 may be a steering actuator 17 operatively interconnected between the rigid frame and each rotor assemblies 12, 13 for selectively and independently tilting the rotor assemblies toward and away from the centerline 23 of the rigid frame, about an axis that is substantially parallel to the centerline 23. This action, combined with the frictional rotation of the trowel blades 32, causes the power trowel to move forward or backward along the concrete surface. The steering actuators 17 may be hydraulic, pneumatic, or electric actuators. While the axes about which the rotor assemblies tilt have been described as substantially perpendicular or substantially parallel with respect to the centerline 23, other orientations of the tilt axes are possible without departing from the scope of the invention.

FIG. 2 shows an exploded view of various components in one embodiment of an assembly for the hybrid drive train 100. Again, the rigid frame is omitted. In this embodiment, the engine 18 and generator 20 are coupled together and mounted in a central location on the power trowel. Electrical control modules including an engine control unit (ECU) 40, a machine control unit (MCU) 42, and a generator controller that houses DC rectifier 22, are mounted at accessible locations atop or adjacent to the engine 18 and generator 20. The rotor assemblies 12 and 13 are mounted on either side of the centerline 23 in a symmetrical configuration so that the center of mass of the power trowel occurs near the centerline 23. Motor controllers 24 and 26 for controlling power input to motors 14 and 15, respectively, are located adjacent to either motor 14 or 15, or in another convenient location. A User Input Display 50 may be mounted to the rigid frame at a convenient location for an operator.

Figures 3, 4, 5:
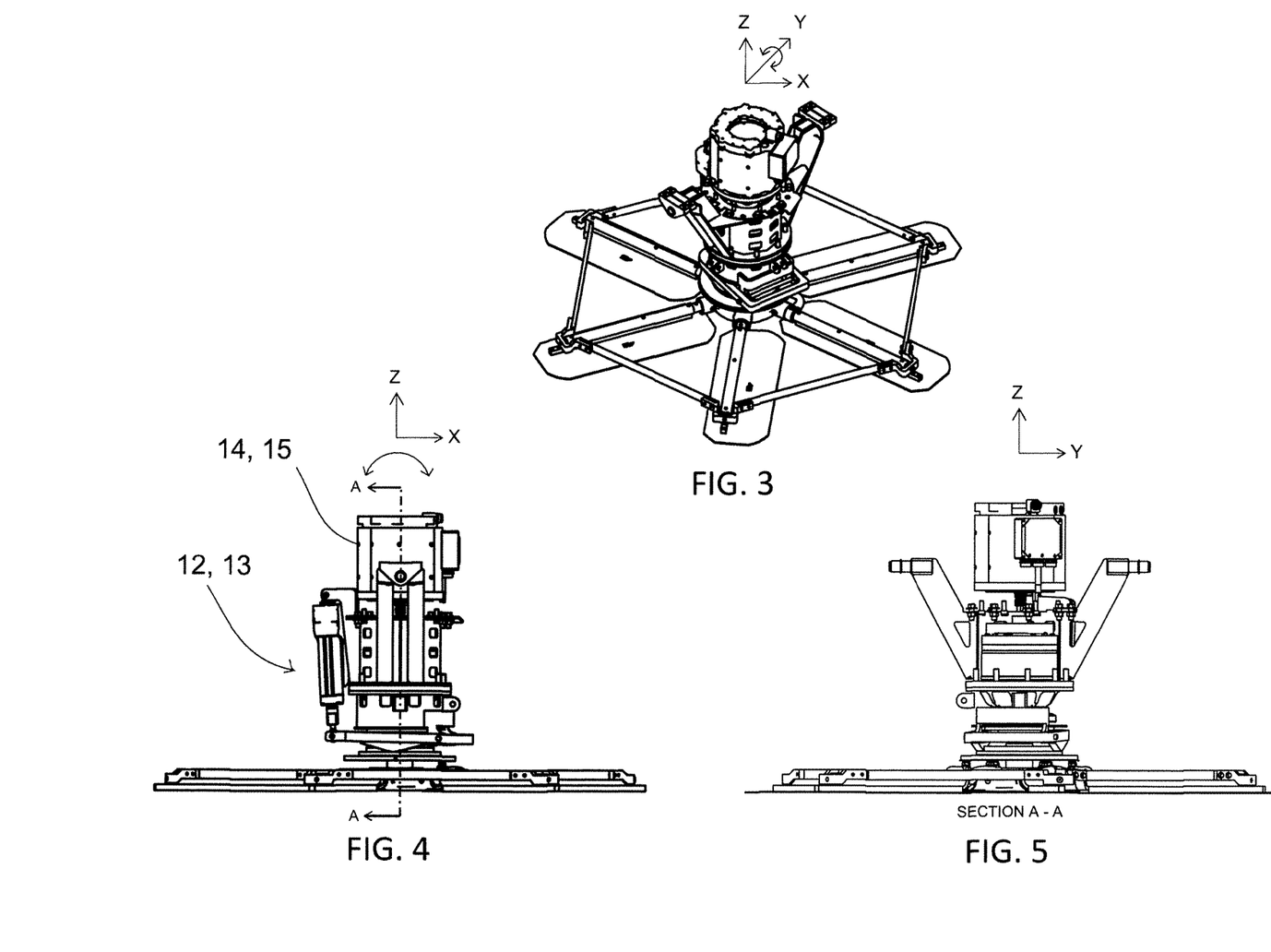
FIG. 3 is a perspective view of one embodiment of a rotor assembly for a hybrid drive train for a self propelled power trowel according to the invention.
FIG. 4 is a side view of the rotor assembly of FIG. 3.
FIG. 5 is a cross sectional side view of the rotor assembly of FIG. 3 taken along Section A-A of FIG. 4.

FIG. 3 shows a perspective view of one embodiment of a rotor assembly 12 or 13 for a hybrid drive train for a self propelled power trowel according to the invention. FIG. 4 shows a side view of the rotor assembly of FIG. 3, and FIG. 5 shows a cross sectional side view of the rotor assembly of FIG. 3 taken along Section A-A of FIG. 4. These three views of a rotor assembly 12 or 13 better illustrate a means for tilting the rotor assembly. In these views, the rotor assembly 12 or 13 is configured for a single degree of rotational freedom. The axes x, y, and z establish orthogonal coordinates for purposes of illustration. The x-axis runs in a horizontal side-to-side direction perpendicular to the centerline 23 of the power trowel. The y-axis runs in a horizontal fore-to-aft direction parallel to the centerline 23. The z-axis runs in a vertical direction perpendicular to the x-axis and y-axis. The coordinate axes in FIG. 3 indicate that this rotor assembly 12 or 13 is configured for one rotational degree of freedom about the y-axis.

Figures 6, 7, 8:
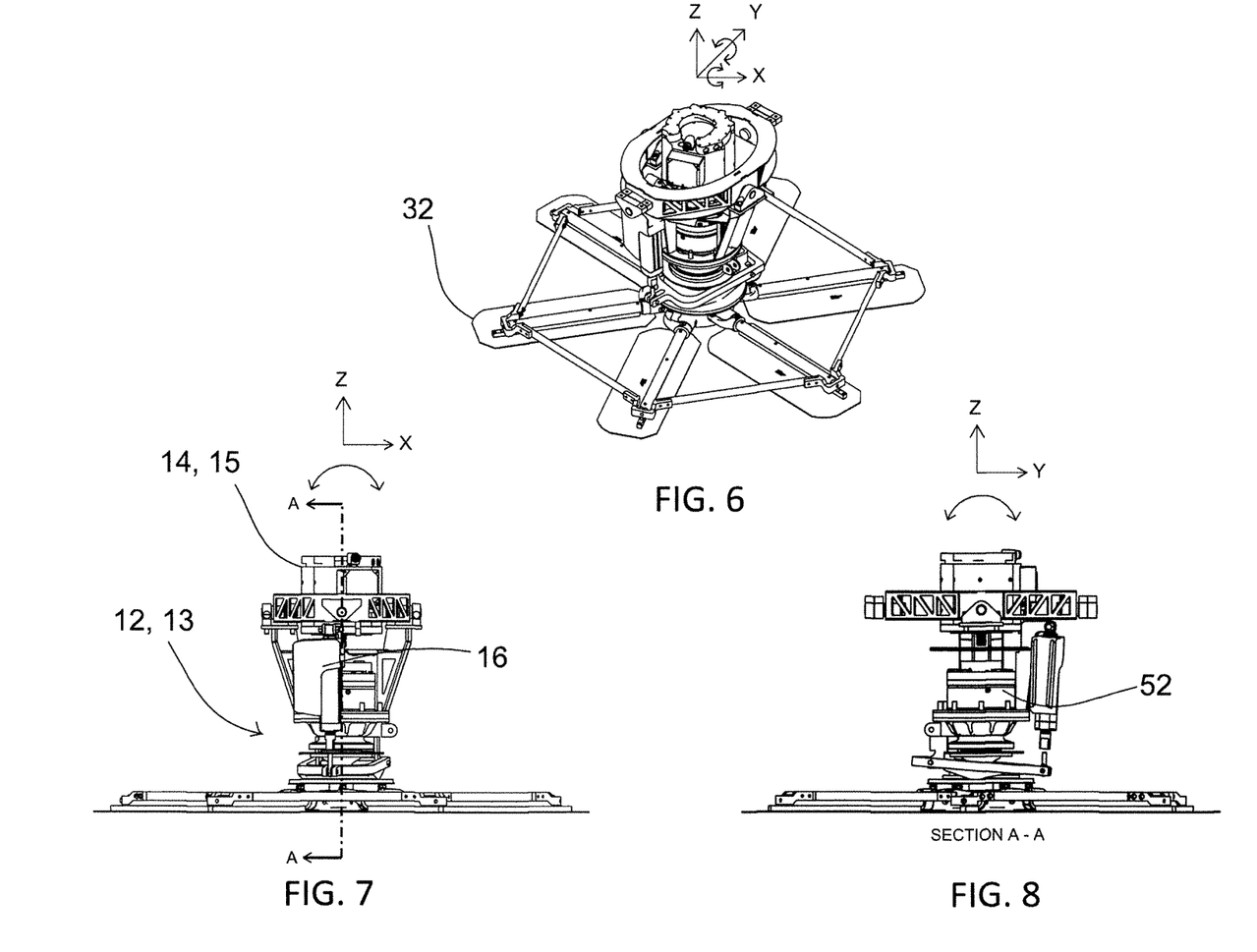
FIG. 6 is a perspective view of one embodiment of a rotor assembly with a tilting mechanism configured for two degrees of rotational freedom, for a hybrid drive train for a self propelled power trowel according to the invention.
FIG. 7 is a side view of the rotor assembly of FIG. 6.
FIG. 8 is a cross sectional side view of the rotor assembly of FIG. 6 taken along Section A-A of FIG. 7.

FIG. 6 shows a perspective view of another embodiment of a rotor assembly 12 or 13 with a tilting mechanism configured for two degrees of rotational freedom, for a hybrid drive train for a self propelled power trowel according to the invention. FIG. 7 shows a side view of the rotor assembly of FIG. 6, and FIG. 8 shows a cross sectional side view of the rotor assembly of FIG. 6 taken along Section A-A of FIG. 7. The coordinate axes x, y, and z in FIG. 6 indicate that this rotor assembly 12 or 13 is configured for two rotational degrees of freedom about both the x-axis and the y-axis.

The two degrees of rotational freedom are provided by means of steering actuators 17 in a similar fashion to the single degree of rotational freedom as previously described. The steering actuator 17 is configured to tilt rotor assembly 12 or 13 with respect to the rigid frame about the x and y axes. The lower right figure also shows the trowel blades 32 of the rotor assembly rotatably connected through a gearbox 52 to the motor 14 or 15.

Figure 9:
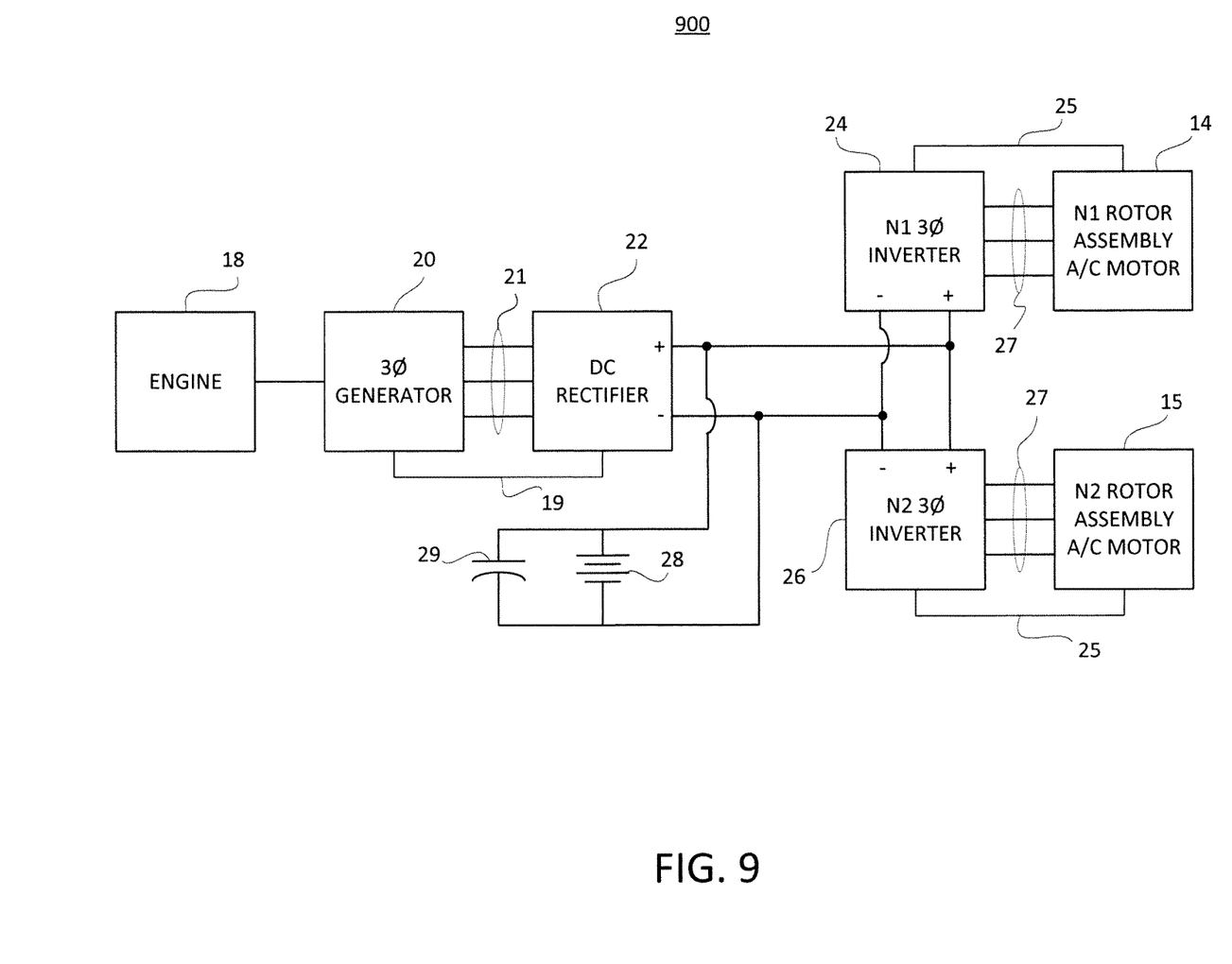
FIG. 9 is a block diagram of one embodiment of a hybrid drive train for a self propelled power trowel according to the invention.

FIG. 9 is a block diagram of one embodiment 500 of a hybrid drive train for a self propelled power trowel according to the invention. The main components of the hybrid drive train 500 include an engine 18, a 3-phase electric generator 20, a DC rectifier 22, 3-phase inverters 24, 26 (the "N1" and "N2" inverters), and AC motors 14, 15 for the "N1" and "N2" rotor assemblies. An optional battery 28 and optional capacitance bank 29 may be connected across the input terminals of the inverters 24, 26. The bulkier components such as the engine 18 are mounted directly to the rigid frame of the power trowel. Other components may also be mounted to the rigid frame, or may be mounted directly to one of the bulkier components. In this embodiment, the combination of engine 18, generator 20, and rectifier 22 serves as the electrical power source 10 described above.

Engine 18 is the prime mover for the drive train of the power trowel. Engine 18 is preferably a gasoline or diesel engine, but it may also run on other fuel sources. For example, one embodiment of the power trowel may employ a Ford model MSG 425 2.5-liter gasoline, natural gas, or liquefied petroleum gas engine. Another, lighter duty embodiment of the power trowel may comprise a Ford model TSG-415 1.5-liter engine. Other makes and models of engines may be used as engine 18, depending on the scale of the power trowel and the desired fuel source. In the drive train, the engine 18 is mechanically coupled to the generator 20 to provide mechanical energy thereto.

Generator 20 comprises a 3-phase AC electrical generator that converts the mechanical energy of the engine 18 into electrical power. The size of the generator 20 may be selected according to the power requirements of the drive train. In one embodiment, generator 20 is a Parker Hannifin model GVM-210-100, permanent magnet liquid-cooled synchronous AC motor, having a peak output torque rating of 168 Nm, and having a maximum peak power rating of 142 kW. Generator 20 may be coupled to the rectifier 22 by a resolver cable 19 for purposes of feedback control. Another embodiment would use an encoder for feedback control. The electrical output of the generator 20 is transmitted by 3-phase power cable 21 to the DC rectifier 22. The DC rectifier 22 converts the 3-phase AC power to a DC voltage. An optional battery 28 may be connected across the terminals of the DC rectifier 22, to assist in supplying power to motors 14, 15 during periods of high demand, and to absorb energy in the event of back emf. In one embodiment, the DC rectifier may comprise a Sevcon voltage-matched inverter compatible with GVM series motors and operating in rectifier mode.

Generator 20 is preferably configured with a bus voltage regulator that is tuned to handle abrupt changes in load. When the generator 20 is loaded and unloaded, the engine speed correspondingly drops and increases, thus making it more difficult to regulate the voltage. In some cases, the performance of motors 14, 15 is largely unaffected by variations in DC voltage, as the capacitance of the DC bus alone is sufficient to smooth out or transients. In more extreme scenarios, however, it is possible that during a trowelingoperation abrupt changes in load can cause a significant loss (or spike) in bus voltage for which the voltage regulator of generator 20 cannot compensate quickly enough. Then when the load is abruptly removed, the back EMF of the motor may backfeed onto the DC bus, causing a large spike in voltage that is beyond the filtration capacity of the bus. According to the invention, adding an external DC bus capacitor or capacitor bank 29 across the output of DC rectifier 22 (with or without the presence of battery 28) filters out some of this variance, allowing the system (both generator 20 and motors 14, 15) to handle larger abrupt load changes without loss of control. In general, when determining the amount of capacitance 29, the objective is to reduce the ripple in the DC bus voltage to an acceptable level, depending on the application. In one embodiment, capacitance 29 is chosen to reduce the ripple to about 5% or less. Adding the external capacitance 29 assists with voltage regulation, which in turn helps the engine regulate speed or maintain a more constant speed, which in turn facilitates regulation of the DC voltage. In essence, the capacitance 29 is used to dampen mechanical oscillation of engine speed to allow a more stable voltage to be rectified.

The DC power output from DC rectifier 22 is coupled to the input terminals of each of two 3-phase inverters 24, 26, which correspond to the left (N1) and right (N2) rotor assemblies 12, 13. The inverters 24, 26 may each comprise a Sevcon voltage-matched inverter compatible with GVM series motors. The power output from each inverter 24, 26 is supplied via 3-phase power cables 27 to an AC motor 14 or 15, respectively. Each inverter 24, 26 may be coupled to its corresponding AC motor 14, 15 by a resolver or encoder cable 25 for purposes of feedback control.

Motors 14, 15 are preferably identical models. Each motor 14, 15 preferably comprises a 3-phase, brushless, synchronous AC motor that provide the motive force for rotor assemblies 12, 13. The size of the motors 14, 15 may be selected according to the power requirements of the drive train. In one embodiment, each motor 14, 15 is a Parker Hannifin model GVM-210-075X, permanent magnet liquid-cooled synchronous AC motor, having a peak output torque rating of 82 Nm, and having a peak power rating of 23 kW.

Figure 10:
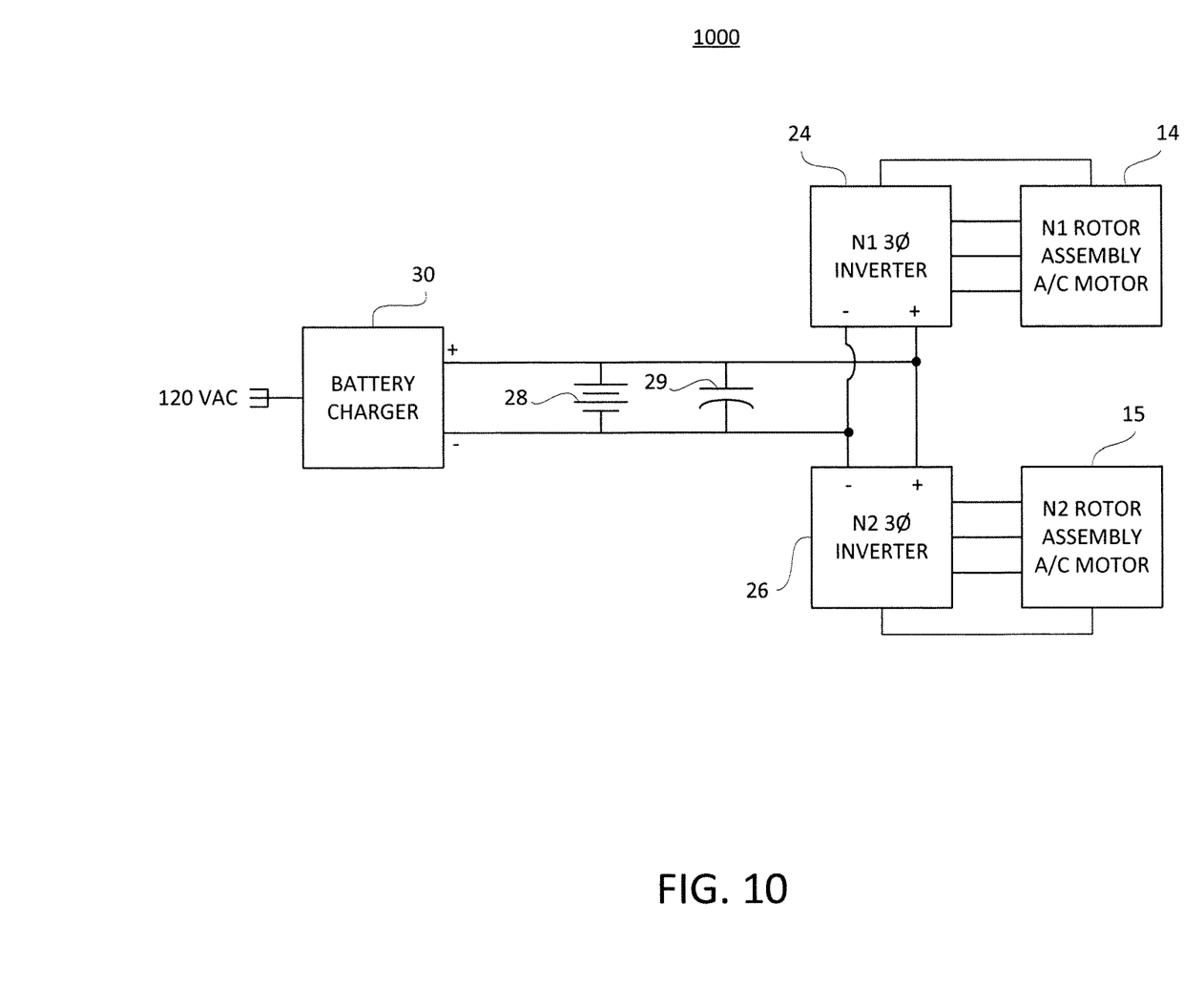
FIG. 10 is a block diagram of another embodiment of a hybrid drive train for a self propelled power trowel according to the invention.

FIG. 10 is a block diagram of an embodiment 600 of a hybrid drive train for a self propelled power trowel according to the invention. In this embodiment, the electrical power source 10 is achieved by means of a battery 28 and battery charger 30, which are used in lieu of the engine, generator, and rectifier described in the previous embodiment. Battery charger 30 is configured to convert AC power, e.g. from a standard 120 or 240 VAC source, into an appropriate DC voltage for charging the battery 28. Battery 28 may be any type known in the art and suitable for this purpose, such as a lithium-ion battery pack or other type used for powering electric vehicles. The power trowel is configured so that the battery charger 30 may be plugged into an electrical outlet for charging while the power trowel is not in service, and disconnected from power when the battery has sufficient charge to drive the trowel. Inverters 24, 26 and AC motors 14, 15 operate as described in the previous embodiment.

Figure 11:
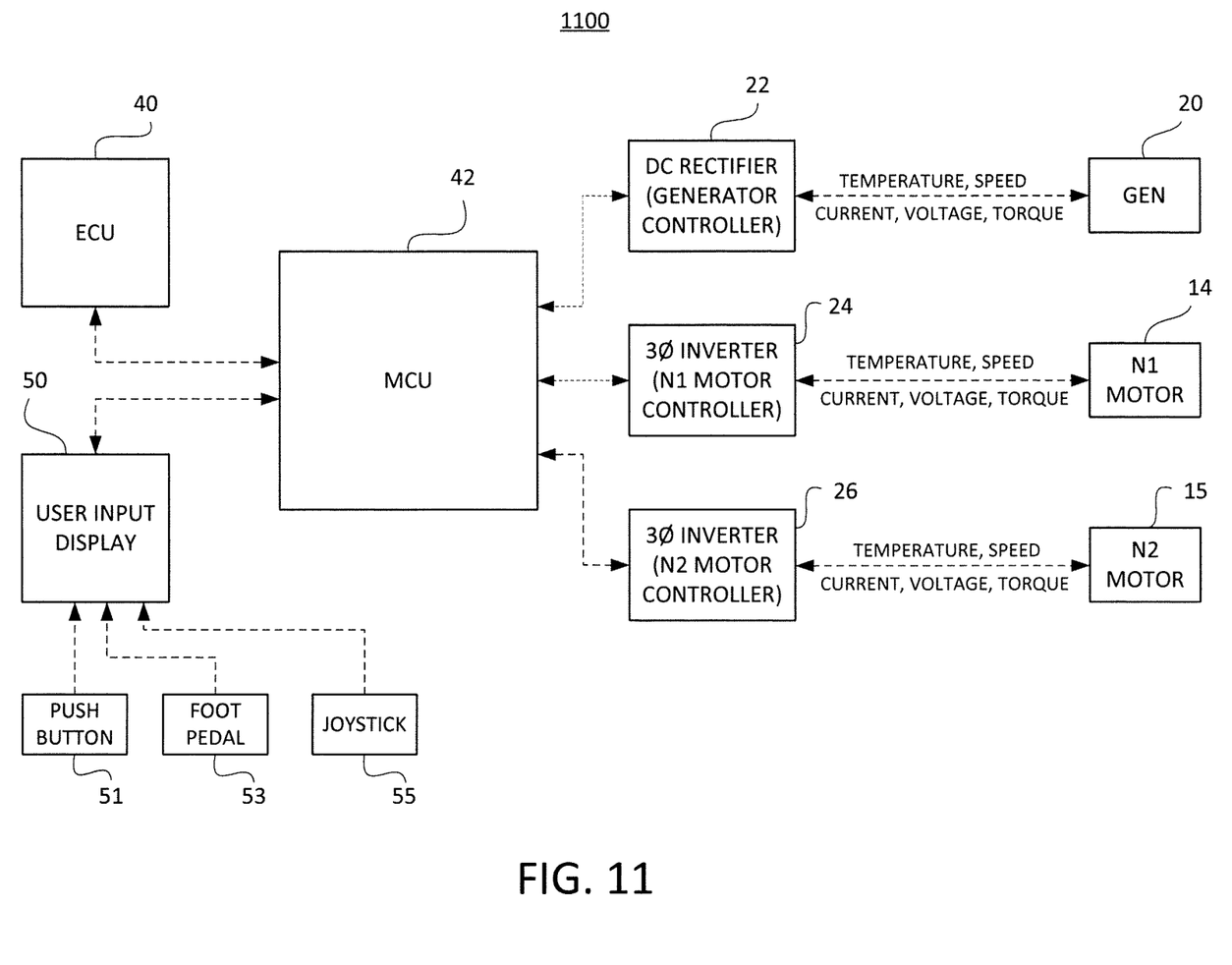
FIG. 11 is a block diagram of a control scheme for a hybrid drive train for a self propelled power trowel according to the invention.

FIG. 11 is a block diagram of a control scheme 700 for a hybrid drive train for a self propelled power trowel according to the invention. Central to control scheme 700 is a Machine Control Unit, or MCU 42. The MCU 42 is a programmable controller having a processor coupled to memory that stores various control algorithms for operating the components of the drive train. In particular, the MCU 42 is configured for adjusting the electrical input to the motors 14, 15, via the inverters 24, 26 using feedback control and operator input, to allow for safe and effective operation of the power trowel. In one embodiment, MCU 42 comprises a Parker Hannifin model IQAN-MC4 master controller. The MCU 42 can be mounted directly to the rigid frame of the power trowel and connected by control cabling to the various instruments and components of the power trowel. The control cabling is indicated in the figure by dashed lines. The arrows indicate the direction of transmission of communication and control signals.

MCU 42 is configured for two-way communication with an Engine Control Unit (ECU) 40, the rectifier 22, the inverter 24, the inverter 26, and the User Input Display 50. Rectifier 22 functions as a controller for generator 20. Inverters 24 and 26 function, respectively, as controllers for motors 14 and 15. These inverter and rectifier modules may be proprietary controllers provided by the OEMs of the engine, generator, and motor. The rectifier 22 and inverters 24 and 26 may configured for receiving control signals representing temperature, speed, current, voltage, and/or torque detected for a corresponding motor or generator, and feeding these signals back to MCU 42. Control signals representing a desired current, voltage, speed, or torque (e.g., an output of an MCU 42 control algorithm) may be transmitted from MCU 42 to rectifier 22 or to an inverters 24, 26 for output to the motor or generator 14, 15, or 20. For example, scheme 700 allows for operation of the motors 14, 15 within a safe temperature range. MCU 42, receiving a rising temperature signal from motor 14 or 15, can, through execution of an appropriate control algorithm, cool the motor by commanding motor controller 24 to reduce their speed thereby lowering the current in the windings. Many other control algorithms are made possible by scheme 700. For example, the rotor assemblies can be operated at constant torque, or at constant speed, by varying the speed of generator 20, and the duty cycle of the AC signal output by the motor controllers 24, 26, etc.

Manual control signals may be generated by means of the User Input Display 50. The User Input Display 50 provides a human interface to the MCU 42, and allows a human operator to program the MCU 42 for automatic operation, to effect manual control, and to access system information via graphical user interface. The User Input Display 50 includes a microprocessor, memory, an operating system, and software configured with human interfacing and non-human interfacing communication protocols. In one embodiment, the User Input Display 50 comprises a Parker Hannifin model IQAN-MD3 display unit. The User Input Display 50 may also communicate with and translate manual control signals from pushbutton 51, foot pedal 53, joystick 55, or other digital or analog inputs that allow a human operator to operate the power trowel, and may also provide the operator with a means for programming the manual controls for customized operation. In another embodiment, some of these manual controls may connect directly to the MCU 42.

A hybrid drive train for a self propelled power trowel constructed according to the foregoing disclosure provides several performance advantages over a similarly sized power trowel that uses mechanical or hydraulic means for driving the rotor assemblies. Table 1 below, prepared by applicant Multiquip Inc., compares the performance of an earlier STXDF model trowel having hydraulic drive motors, with a NEW model trowel constructed with brushless AC synchronous motors (14, 15) according to the invention. Both the STXDF and NEW model trowels use an identically sized gasoline engine 18, e.g. Ford model MSG 425.

TABLE 1

|  | STXDF | NEW |
| --- | --- | --- |
| Power (floor) | 52 hp | 56 hp |
| Power (max) | 84 hp | 84 hp |
| % Efficiency | 62% | 67% |
| Blade speed (max) | 150 rpm | 160 rpm |
| Rotor diameter | 5 ft. | 5 ft. |
| Rotor type | radial piston | 3 ph. AC sync |
| Weight | 2600 lbf | 2700 lbf |
| Output torque (max) | 1700 ft-lb | 2100 ft-lb |

The data in Table 1 demonstrates that the NEW model trowel delivers 8% more power to the floor (i.e. power delivered to the rotors) than the model STXDF, though both models use the same make and model engine. This gain in power output is also reflected in the greater efficiency and speed ratings of the NEW model, despite the NEW model having a slightly higher overall weight. Most significantly, the NEW model provides 23.5% more output torque than its earlier generation counterpart.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A self propelled power trowel, for finishing a concrete surface, which comprises:
    a rigid frame adapted to be disposed over said concrete surface;
    means attached to the rigid frame for providing DC power to said power trowel;
    means for inverting the DC power into an AC output;
    a pair of rotatable rotor assemblies for frictionally contacting said concrete surface and supporting said rigid frame thereabove, tiltably connected to the rigid frame; and
    electrical motor means operatively connected to the AC output and operatively connected to the rotatable rotor assemblies for rotating said rotor assemblies.

2. The self propelled power trowel, for finishing a concrete surface, of claim 1, wherein the means for providing DC power to said power trowel comprises a battery.

3. The self propelled power trowel, for finishing a concrete surface, of claim 2, further comprising a capacitor bank connected in parallel with the battery.

4. The self propelled power trowel, for finishing a concrete surface, of claim 1, wherein the means for providing DC power to said power trowel comprises:
    an internal combustion engine attached to the frame;
    an AC generator operatively connected to the internal combustion engine; and
    a rectifier electrically coupled to the AC generator.

5. The self propelled power trowel, for finishing a concrete surface, of claim 4, wherein the AC generator produces three phase alternating current.

6. The self propelled power trowel, for finishing a concrete surface, of claim 5, wherein the rectifier is configured to:
    receive the three phase alternating current and rectify said current to a selectable DC voltage output.

7. The self propelled power trowel, for finishing a concrete surface, of claim 4, further comprising means for regulating speed of the engine.

8. The self propelled power trowel, for finishing a concrete surface, of claim 7, wherein the regulating means comprises capacitance.

9. The self propelled power trowel, for finishing a concrete surface, of claim 1 wherein the AC output has preselectable frequency, duty cycle, and voltage.

10. A hybrid drive train for a self propelled power trowel, comprising:
    a rigid frame having a front and a rear and defining a centerline from front to rear;
    means for providing DC power to said power trowel attached to the rigid frame;
    means for inverting the DC power into an AC output;
    a pair of rotatable rotor assemblies tiltably connected to the rigid frame and configured to contact a concrete surface below the rigid frame and to support the rigid frame thereabove;
    one or more electrical motors electrically connected to the AC output and operatively connected to the rotatable rotor assemblies to cause rotation of said rotor assemblies;
    means for tilting each rotor assembly toward and away from the centerline of the frame; and
    means for tilting at least one of the rotor assemblies fore and aft, parallel to the centerline of the frame.

11. The hybrid drive train of claim 10 wherein the one or more electrical motors comprise brushless AC synchronous motors.

12. The hybrid drive train of claim 10 wherein the means for providing DC power comprises an engine and generator.

13. The hybrid drive train of claim 12 further comprising a means for regulating speed of the engine.

14. The hybrid drive train of claim 13 wherein the regulating means comprises capacitance.

15. The hybrid drive train of claim 10 wherein the means for providing DC power comprises a battery.

16. The hybrid drive train of claim 15 further comprising a capacitor bank in parallel with the battery.

17. A hybrid drive train for a self propelled power trowel, comprising:
    a frame;
    an engine-generator set attached to the frame and configured to provide electrical power to the power trowel;
    a pair of rotatable rotor assemblies tiltably connected to the frame and configured to contact a concrete surface below the frame and to support the frame thereabove;
    one or more rectifiers attached to the frame and configured to convert the electrical power from the engine-generator set to DC power;
    one or more inverters attached to the frame and configured to convert the DC power to AC output; and
    one or more brushless AC synchronous motors electrically connected to the one or more inverters and operatively connected to the rotatable rotor assemblies to cause rotation of said rotor assemblies.

18. The hybrid drive train of claim 17 further comprising capacitance coupled to the DC power from the one or more rectifiers and configured for regulating speed of the engine-generator set.

19. The hybrid drive train of claim 17 wherein the AC output has preselectable frequency, duty cycle, and voltage.

20. The hybrid drive train of claim 10 wherein the AC output has preselectable frequency, duty cycle, and voltage.

* * * * *